United States Patent [19]
Chvojcsek

[11] Patent Number: 5,395,178
[45] Date of Patent: Mar. 7, 1995

[54] TRIPOD FOR SUPPORTING A SHORTHAND MACHINE

[75] Inventor: Frank Chvojcsek, W. Dindee, Ill.

[73] Assignee: Stenograph Corporation, Del.

[21] Appl. No.: 3,961

[22] Filed: Jan. 15, 1993

[51] Int. Cl.$^6$ .......................................... F16M 11/00
[52] U.S. Cl. .................................. 403/349; 403/348; 403/187; 248/177
[58] Field of Search ............... 400/91, 691, 692, 693, 400/680; 248/177, 224.1, 231.3; 403/13, 14, 348, 349, 294, 187

[56] References Cited

U.S. PATENT DOCUMENTS

| | | | |
|---|---|---|---|
| 1,112,944 | 10/1914 | Stone | 400/691 |
| 1,520,085 | 12/1924 | Rossiter | 400/691 |
| 1,623,196 | 4/1927 | Neahr | 400/691 |
| 3,006,052 | 10/1961 | Stickney | 248/177 |
| 3,185,533 | 5/1965 | Lindberg | 400/693 |
| 3,415,477 | 12/1968 | Kondur | 248/231.3 |
| 3,638,776 | 2/1972 | Ridge | 400/91 |

*Primary Examiner*—Randolph A. Reese
*Assistant Examiner*—Anthony Knight
*Attorney, Agent, or Firm*—Willian, Brinks, Hofer, Gilson & Lione

[57] ABSTRACT

A tripod for engaging and supporting a portable shorthand machine. The tripod includes support legs, a stem coupled to the support legs, and a coupler assembly coupled to the stem. The coupler assembly includes coupler member for engaging the shorthand machine, and a key means for ensuring that the coupler member engages the shorthand machine with a predetermined orientation. The key ensures proper orientation by engaging a key groove that is formed in the shorthand machine and has substantially the same outer geometry as the key means. This outer geometry is chosen such that the key means must be placed in a predetermined orientation with respect to the key groove in order to properly engage the key groove.

12 Claims, 6 Drawing Sheets

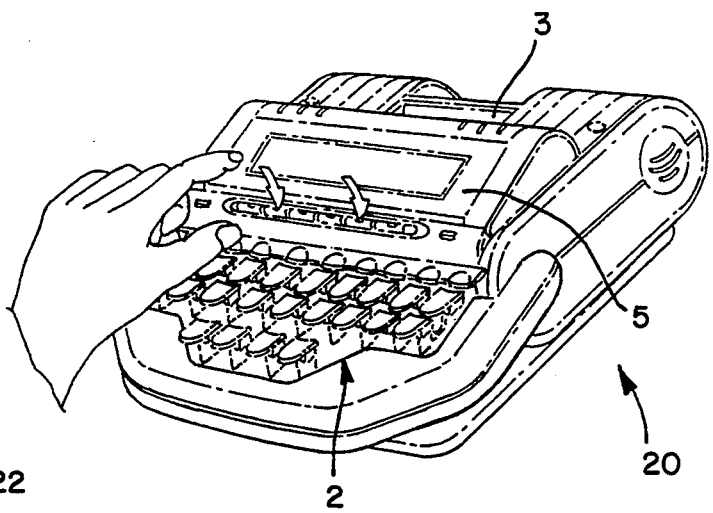
FIG. 1
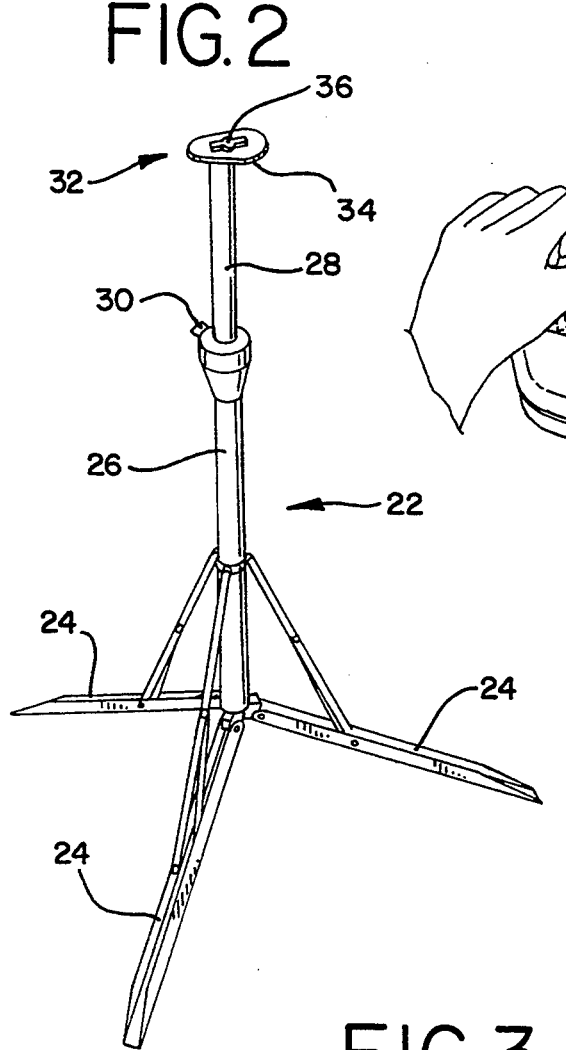
FIG. 2
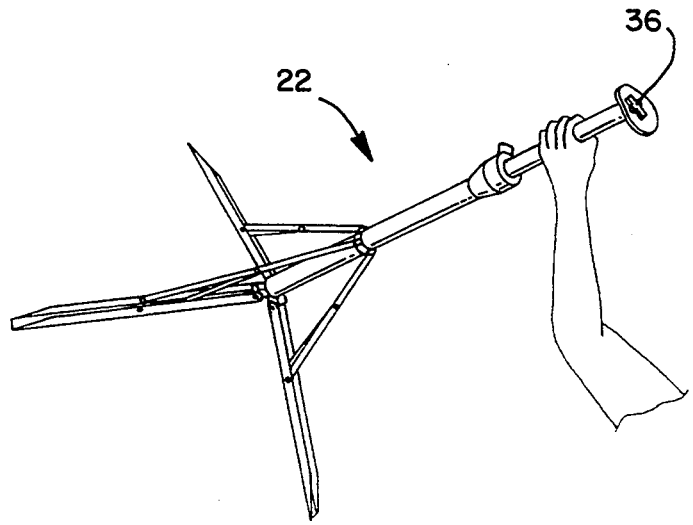
FIG. 3
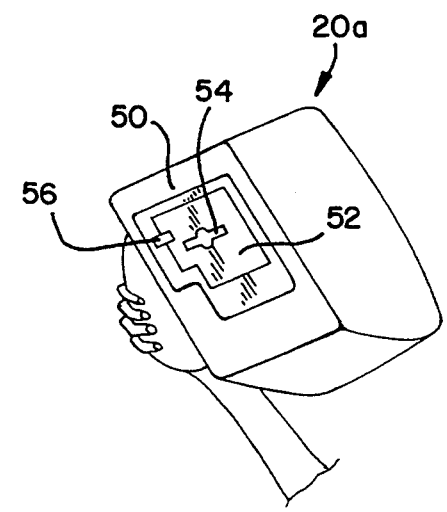

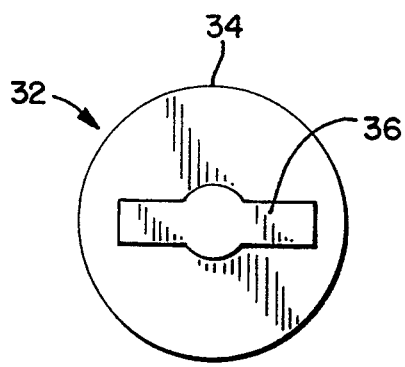
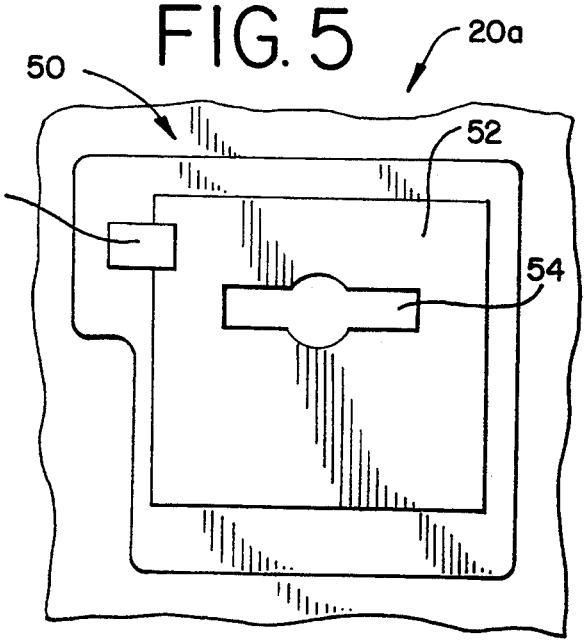
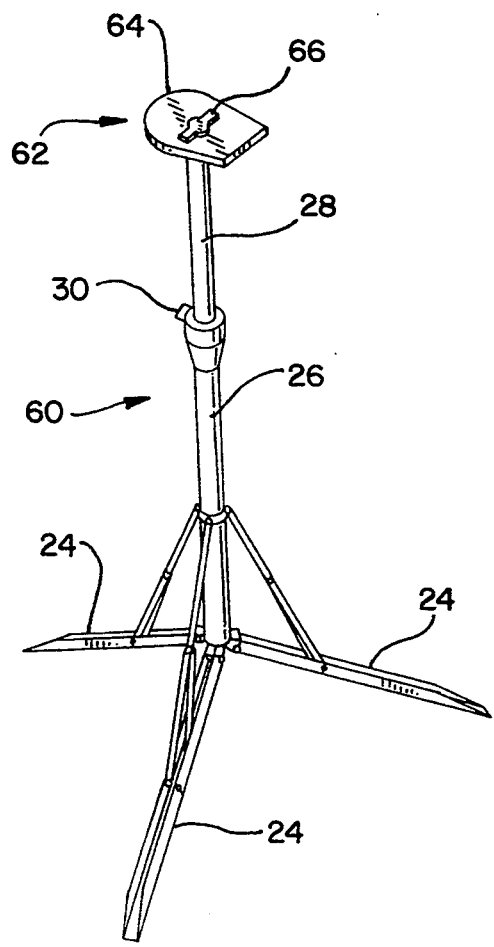
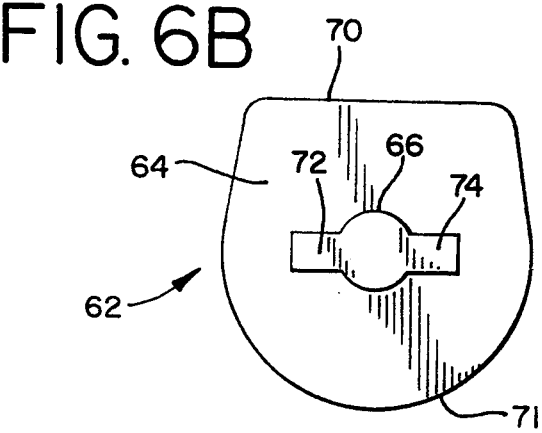
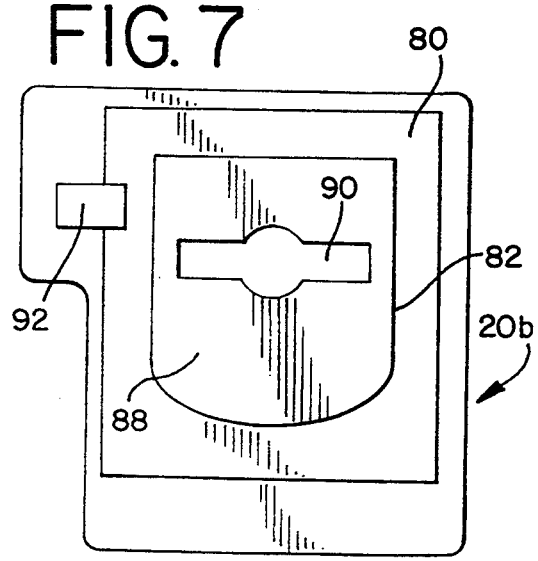

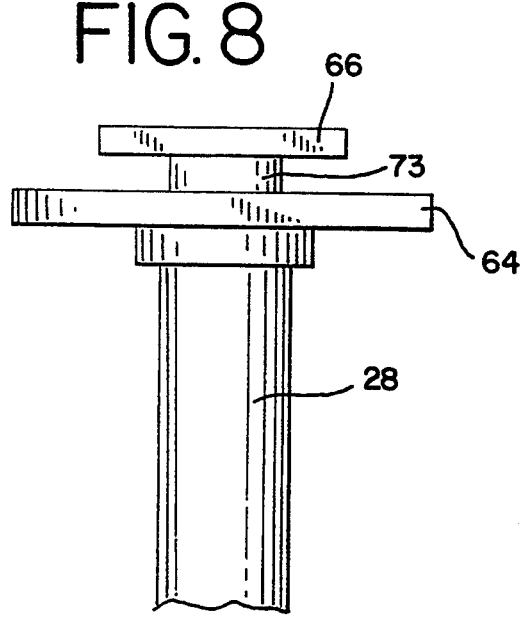
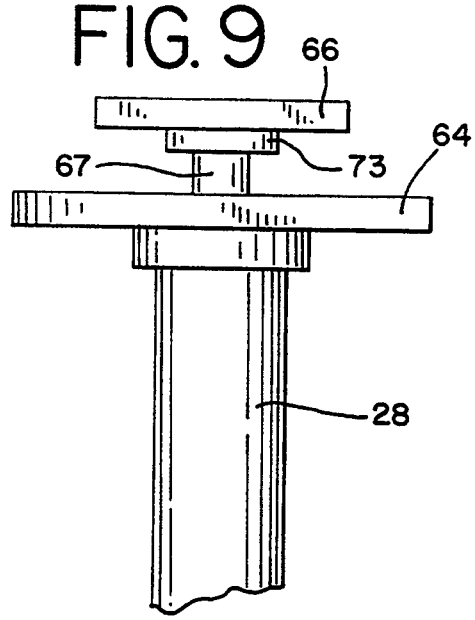
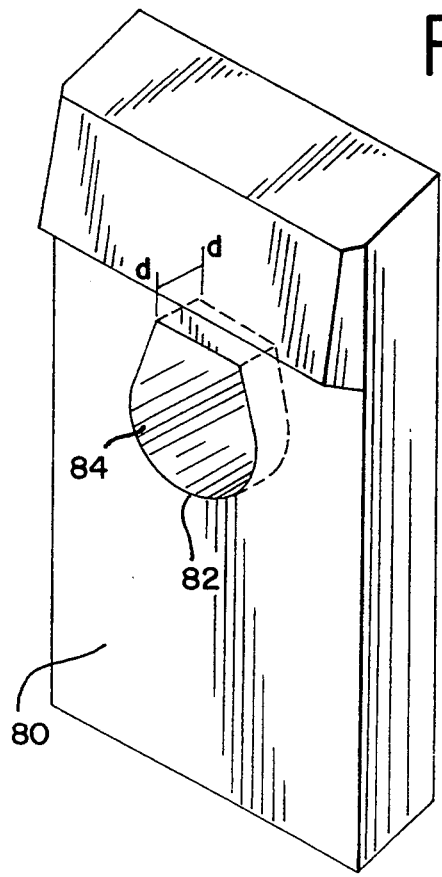
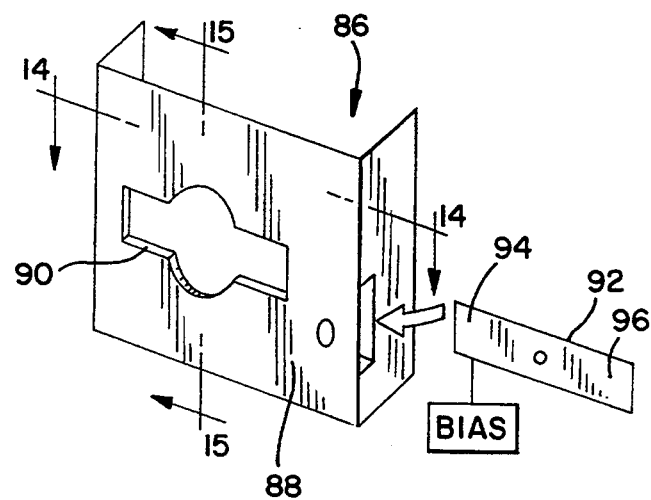

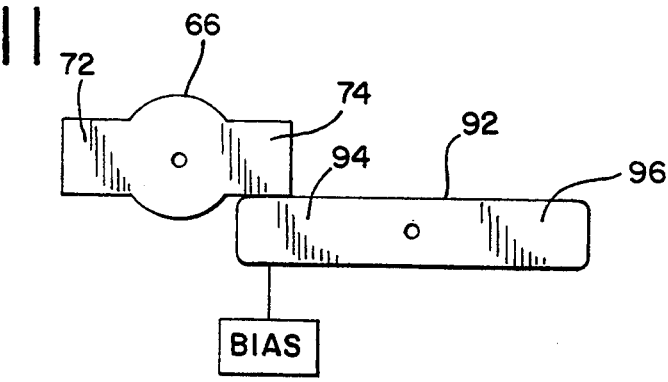
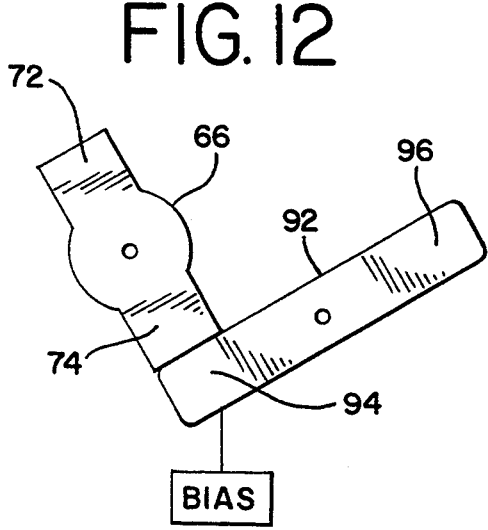
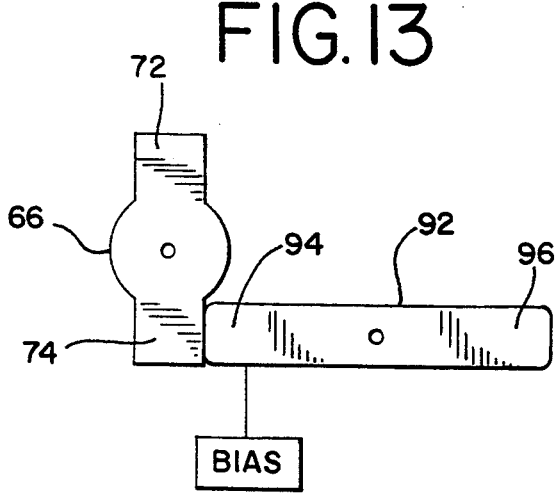
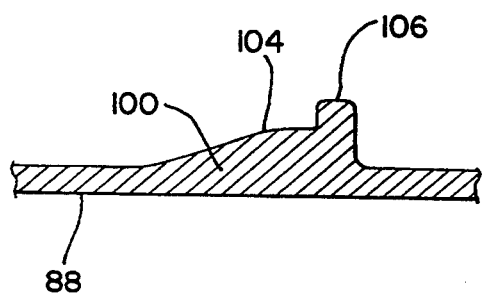
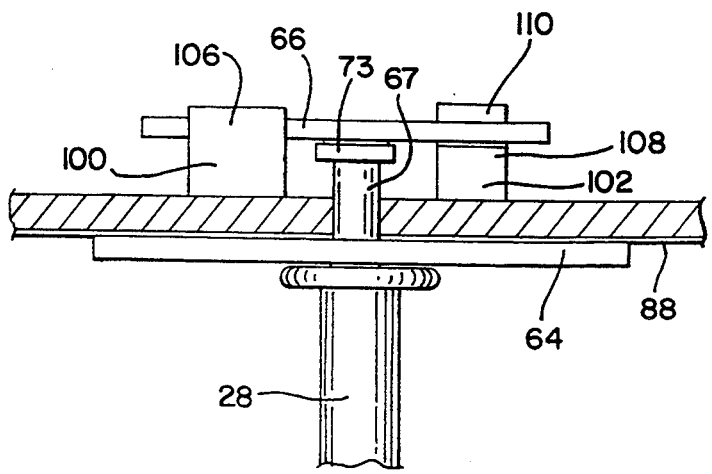

TRIPOD FOR SUPPORTING A SHORTHAND MACHINE

FIELD OF THE INVENTION

This invention relates in general to a tripod for supporting a portable shorthand machine. More particularly, it relates to a tripod having an improved design for mating and securing the tripod to a shorthand machine.

BACKGROUND OF THE INVENTION

Shorthand machines are used to record spoken words in a visual form. For example, stenographers typically use shorthand machines to record statements made in depositions, hearings, trials and other official proceedings.

The Stenograph Corporation is the assignee of the present invention. Shorthand machines manufactured by Stenograph have operated successfully and efficiently for many decades. Accordingly, Stenograph's employees have been granted numerous U.S. patents related to shorthand machines, including U.S. Pat. No. 2,319,273; U.S. Pat. No. 3,557,927; U.S. Pat. No. 3,731,278; U.S. Pat. No. 4,205,351; U.S. Pat. No. 4,323,316; U.S. Pat. No. 4,363,557; U.S. Pat. No. 4,363,558; U.S. Pat. No. 4,439,798; and U.S. Pat. No. 4,421,427. Each of these patents is incorporated herein by reference.

The conventional shorthand machine has a keyboard of twenty-two phonetically-related characters which, to the skilled operator, provides all the combinations necessary to record words and numbers. The record produced by the machine may be a paper tape on which the phonetic characters are printed, or the characters may be recorded on a magnetic tape medium.

FIG. 1 illustrates a novel shorthand machine 20 capable of recording and translating shorthand notes automatically. The details of the automatic translation features of the shorthand machine 20 are provided in U.S. application Ser. No. 07/822,293, filed Jan. 17, 1992, and assigned to The Stenograph Corporation. The entire disclosure of this application is incorporated herein by reference. The details of the paper tape recording features of the shorthand machine 20 are generally described in U.S. Pat. No. 2,319,273. The details of the electronic/magnetic recording features of the shorthand machine 20 are generally described in U.S. Pat. No. 3,557,927 and U.S. Pat. No. 4,205,351.

To record a word on a shorthand machine, the stenographer presses an appropriate combination of keys, and the machine mechanically prints the characters simultaneously on a paper tape, or in the case of electronic recordings, combinations of electronic pulses are recorded on a magnetic tape or disk medium. For paper recordings, the keys actuate associated type bars to cause the type bars to impact an inked ribbon to print characters on the paper.

An important feature of any shorthand machine is its portability. This is because stenographers must be able to set up operations quickly and efficiently in a variety of places. Thus, most shorthand machines are small and light enough to be carried by the average person.

Many shorthand machines are also provided with a coupling mechanism for mating with a collapsible tripod. FIGS. 2 and 3 illustrate a known tripod 22 that can be used to support a shorthand machine. As shown in FIG. 2, the tripod 22 includes three collapsible legs 24, a main cylinder 26, a retractable stem 28, a height adjustment knob 30, and a coupler assembly 32 for mating with a coupling mechanism in the base of a shorthand machine. The use of an adjustable tripod 22 allows the stenographer to easily position the shorthand machine at a comfortable height. Tripods also allow stenographers to set up their shorthand machines without regard to whether there is a table or other similar structure available to support the machine.

The coupler assembly 32 includes an end plate 34 connected to the stem 28, and a coupler member 36 connected to a retractable tube (not shown). A clearance ring 40 (shown in FIGS. 8 and 9) is positioned around the retractable tube and adjacent to the end plate 34. The retractable tube extends through the end plate 34 and into the stem 28. The retractable tube is biased inside the stem 28 such that the clearance ring 40 is biased against the end plate 34. The clearance ring 40 ensures that at least a 0.070 inch clearance is maintained between the end plate 34 and the coupler member 36.

As shown in FIGS. 3 and 5, a known configuration for the base portion 50 of a shorthand machine 20a includes a base plate 52 having a slot 54. A coupling mechanism (not shown) is positioned behind the base plate 52. A pivoting lever 56 is provided for securing the tripod 22 in its attached position, and also for releasing the tripod 22 from its attached position.

The coupler assembly 32 shown in FIGS. 2, 3, 4 and 5 is mated with the base portion 50 shown in FIGS. 3 and 5 by first inserting the coupler member 36 into the slot 54 in the base portion 50. The tripod 22 is then rotated approximately 90 degrees until the coupler member 36 engages the coupling mechanism (not shown) in the base portion 50 of the shorthand machine 20a.

The most efficient method of engaging the base portion 50 to the tripod 22 is to first unfold the tripod 22, place it in a desired spot on the floor, and then lower the shorthand machine 20a over the tripod 22 to insert the coupler member 36 into the slot 54. In practice, however, this is difficult to do with known tripods because of the relatively small and precise mating orientation between the coupler member 36 and the slot 54, as shown in FIGS. 4 and 5.

As a result, the most efficient way to mate the tripod 22 to the base portion 50 is to grasp the tripod 22 in one hand and tilt it to the side such that the coupler member 36 can be viewed, grasp the side of the shorthand machine 20a in the other hand and tilt it to the side such that the slot 54 can be viewed, and then "look" at the coupler member 36 and guide it into the slot 54. This maneuver is illustrated generally in FIG. 3.

Although portable shorthand machines and tripods are light enough to be carried, it is still cumbersome to use the maneuver illustrated in FIG. 3 to engage the coupler member 36 in the slot 54. Thus, there is a need for a portable tripod and shorthand machine having a simple and efficient method of mating the tripod to the portable shorthand machine.

SUMMARY OF THE INVENTION

Accordingly, it is an object of the present invention to provide an improved portable tripod and shorthand machine.

It is another object of the present invention to provide an improved structure and method for mating a tripod to a shorthand machine.

It is also an object of the present invention to provide a simple and efficient structure and method for mating a tripod to a shorthand machine.

These and other objects and advantages are realized in accordance with the present invention by providing a tripod capable of supporting a shorthand machine. The tripod generally includes support legs, a stem connected to the support legs, and a coupler assembly connected to the stem. The coupler assembly includes a coupler member for engaging the base of the shorthand machine and securing the tripod to the shorthand machine. The coupler assembly further includes a key for ensuring that the coupler member engages the shorthand machine with a predetermined orientation.

In the disclosed embodiments of the invention, the key ensures proper orientation by engaging a key groove formed in the shorthand machine. The key groove has substantially the same outer geometry as the key. This outer geometry is chosen such that the key must be placed in a predetermined orientation with respect to the key groove in order to engage the key groove. In a preferred embodiment, the outer geometry of the key includes at least one substantially planar edge and at least one substantially curved edge.

Accordingly, the present invention provides several advantages. For example, the outer geometry and relative size of the key may be chosen such that its proper orientation with respect to the key groove is easily achieved without the need to actually see the key as it is inserted into the key groove. Thus, a shorthand machine is easily mated with the coupler assembly of the tripod by first unfolding the tripod and placing it in a desired position on the floor, grasping the shorthand machine with both hands, and then lowering the shorthand machine over the tripod until the key engages the key groove. When the key is properly oriented with respect to the key groove, the coupler member is automatically orientated with respect to the shorthand machine.

BRIEF DESCRIPTION OF THE DRAWINGS

FIG. 1 illustrates the general features of a portable shorthand machine capable of being used in connection with the present invention;

FIG. 2 illustrates a known collapsible tripod capable of supporting a shorthand machine;

FIG. 3 illustrates a maneuver for engaging the tripod shown in FIG. 2 with a known configuration for the base portion of the shorthand machine shown in FIG. 1;

FIG. 4 illustrates a top view of the coupler assembly of the tripod shown in FIG. 2;

FIG. 5 illustrates a known configuration for the base portion of the shorthand machine shown in FIG. 1;

FIG. 6a illustrates a collapsible tripod embodying the present invention;

FIG. 6b illustrates a top view of the coupler assembly of the tripod shown in FIG. 6a;

FIG. 7 illustrates a novel configuration for the base portion of the shorthand machine shown in FIG. 1 embodying the present invention;

FIG. 8 illustrates a side view of the coupler assembly of the tripod shown in FIG. 6a;

FIG. 9 illustrates another side view of the coupler assembly of the tripod shown in FIG. 6a;

FIG. 10 illustrates an exploded view of the base portion of the shorthand machine shown in FIG. 7 embodying the present invention;

FIG. 11 illustrates the relative positions of the coupler member shown in FIG. 6a and the lever shown in FIG. 7 after the coupler has been inserted in a slot in the base of the shorthand machine;

FIG. 12 illustrates the relative positions of the coupler member and the lever shown in FIG. 11 after the coupler member has been inserted into a slot in the base of the shorthand machine and rotated approximately 45 degrees;

FIG. 13 illustrates the relative positions of the coupler member and the lever shown in FIG. 11 after the coupler member has been rotated approximately 90 degrees;

FIG. 14 illustrates a sectional view of the base plate of the shorthand machine shown in FIG. 10 taken along line 14—14;

FIG. 15 illustrates a partial sectional view of the base plate of the shorthand machine shown in FIG. 10 taken along line 15—15. The view has been modified to include the coupler assembly of the tripod shown in FIG. 6a after it has been inserted into a slot in the base plate of the shorthand machine shown in FIG. 7 and rotated 90 degrees clockwise;

DETAILED DESCRIPTION OF THE PRESENTLY PREFERRED EMBODIMENTS

Figure 16:
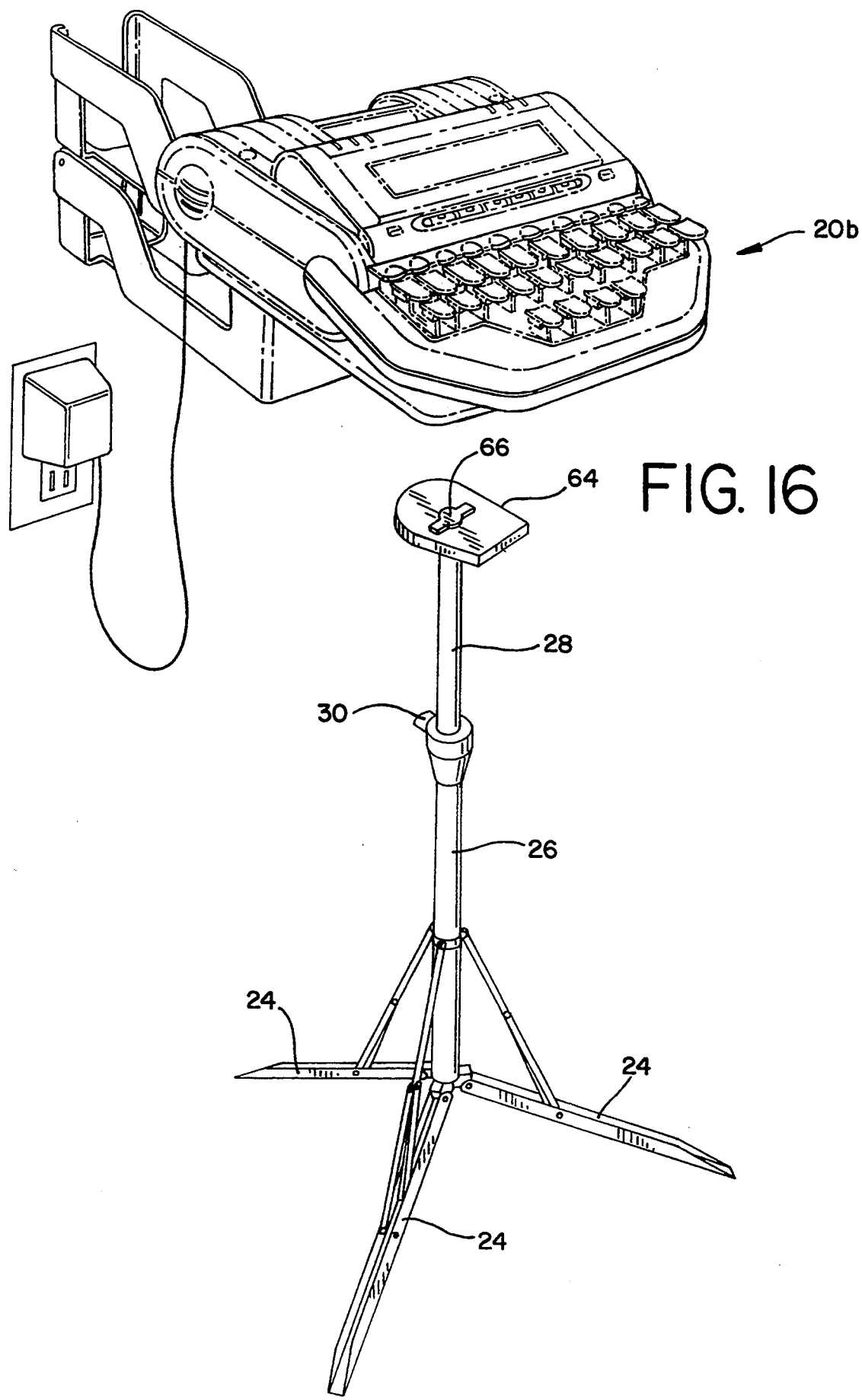
FIG. 16 illustrates a preferred method of engaging the tripod and shorthand machine shown in FIGS. 6a and 7.

Turning now to the drawings, FIGS. 6a and 6b illustrates a tripod 60 embodying the features of the present invention. The tripod 60 is identical to the tripod 22 shown in FIG. 2, except for the coupler assembly 62. Accordingly, the same reference numerals are used to refer to elements common to both tripods 22, 60.

The coupler assembly 62 generally includes a key means 64 and a coupler member or tab 66. In the disclosed embodiment, the key means 64 is made from a substantially flat plate having a planar surface 68 and an outer geometry defined by its outer edges 70, 71 as shown in FIG. 6b. It is contemplated, however, that a variety of sizes and shapes may be suitable for the key means 60, as long as the key means includes the overall functional features disclosed herein.

FIGS. 7 and 10 illustrate a preferred configuration for the base portion 80 of a shorthand machine 20b. The base portion 80 includes a key groove 82 having an inner geometry defined by its inner surface 84. The depth of the key groove 82 is indicated by the line d—d shown in FIG. 10. The base portion 80 further includes a coupling mechanism 86 having a base plate 88 and a slot 90 for engaging the coupler member 66.

The outer edges 70, 71 of the key means 64 have substantially the same geometry as the inner surface 84 of the key groove 82. This geometry is preferably chosen such that there is one proper mating orientation between the key means 64 and the key groove 82. The geometries of the key means 64 and the key groove 82 may also be chosen such that there is more than one proper mating orientation between the key means 64 and the key groove 82, as long as each such orientation also properly aligns the coupler member 66 and the slot 90. In the preferred embodiment, the outer edges of the key means 64 include a substantially planar edge 70 and a substantially curved edge 71, best shown in FIG. 6.

The size of the key means 64 is chosen such that its planar surface 68 is large enough that the key means 64 is easily engaged with the key groove 82 without the need to watch the key means 64 as it is inserted into the key groove 82. In the preferred embodiment, the general surface area of the key means 64 is approximately 2.5 square inches. If an area smaller than 2 square inches is chosen for the key means 64 of the disclosed embodiment, it becomes increasingly difficult to insert the key means 64 into the key groove 82 without looking at the key means 64 and/or the key groove 82.

The key groove 82 is, of course, slightly larger than the key means 64 so that the key means 64 may be inserted into the key groove 82. The clearance between the key groove 82 and the key means 64 should not be so small that there is a large amount of friction between the key means 64 and the inner surface 84 of the key groove 82. Also, the clearance between the key groove 82 and the key means 64 should not be so large that the automatic alignment of the coupler member 66 and the slot 90 (as discussed below) is not achieved. In the preferred embodiment, the clearance between the key groove 82 and the key means 64 is from 0.02 to 0.03 inches.

Figure 17:
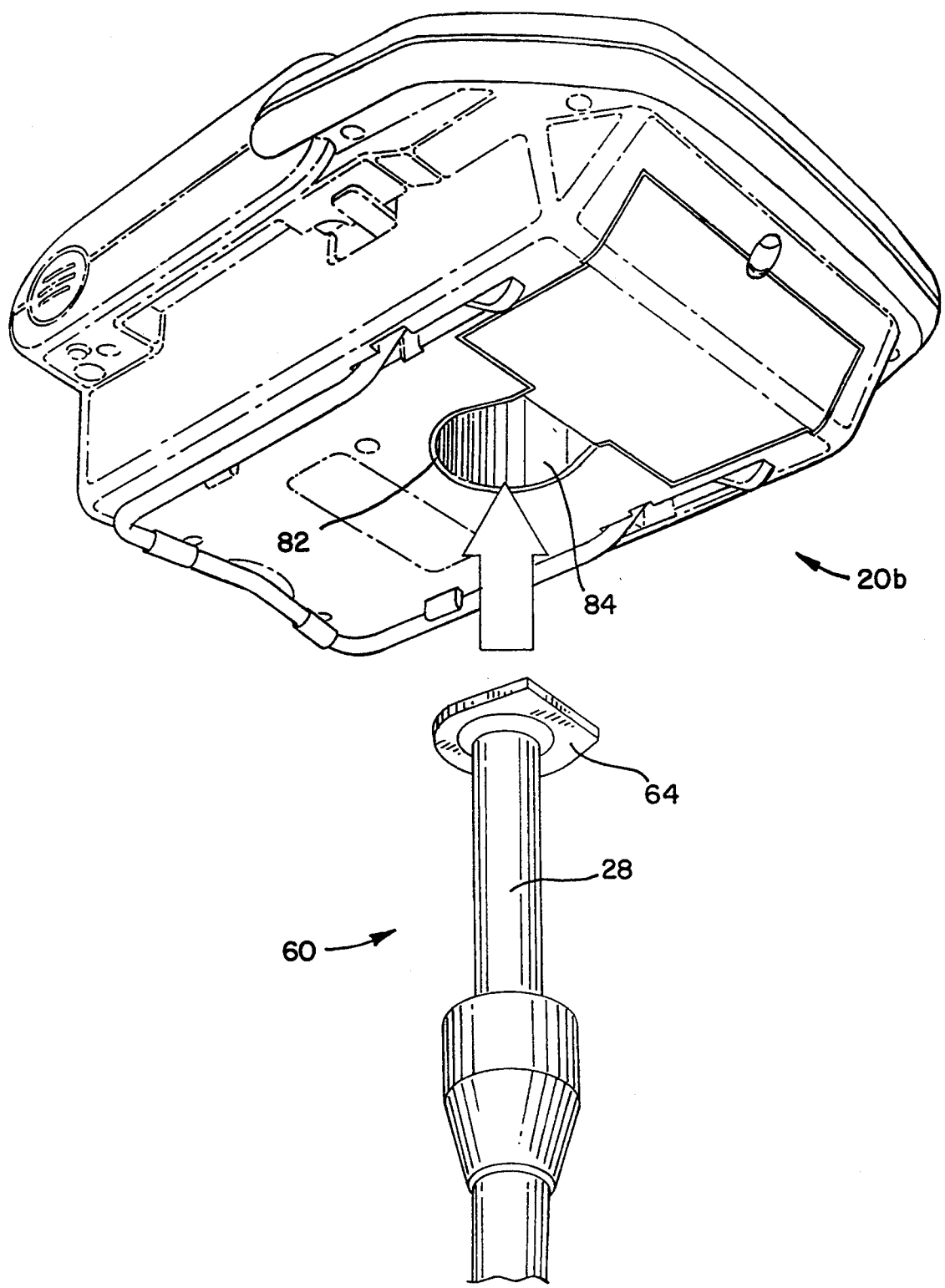
FIG. 17 illustrates a preferred method of engaging the tripod and shorthand machine shown in FIGS. 6a and 7.

FIGS. 16 and 17 illustrate an efficient maneuver for mating the tripod 60 with the base portion 80 of the shorthand machine 20b. First, the tripod 60 is unfolded and placed in a desired spot on the floor. The shorthand machine 20b is then lowered over the tripod until the key means 64 enters the key groove 82. The key means 64 is large enough to be easily engaged with the key groove 82 without the need to watch the key means 64 as it is inserted into the key groove 82. The general orientation of the coupler member 66 with respect to the key means 64 is the same as the general orientation between the slot 90 and the key groove 84. Additionally, there is only one proper orientation for inserting the key means 64 into the key groove 82. Thus, when the key means 64 is properly inserted in the key groove 82, the coupler member 66 is automatically aligned with the slot 90.

The shorthand machine 20b continues to be lowered until the coupler member 66 engages the slot 90. The shorthand machine 20b is then rotated until the coupling mechanism 86 in the base portion 80 of the shorthand machine 20b fully engages the coupler member 66, thereby securing the shorthand machine 20b to the tripod 60. The coupler member 66 is released from the coupling mechanism 86 by releasing a pivoting lever 92, rotating the shorthand machine 20b back to its previous position, and lifting the shorthand machine 20b away from the tripod 60.

Several alternatives are available for implementing the present invention. For example, FIGS. 8 and 9 illustrate the details of the coupler assembly 62. In general, the coupler assembly 62 includes a coupler member 66 connected to a key means 64 and a retractable tube 67. The retractable tube 67 extends through the key means 64 and into the stem 28 of the tripod 60. A clearance ring 73 is located between the coupler member 66 and the retractable tube 67. The retractable tube 67 is biased (preferably by a spring) such that the clearance ring 73 is normally biased against the key means 64. The clearance ring 73 ensures at least a 0.06 inch clearance between the key means 64 and the coupler member 66.

FIG. 9 illustrates the coupler assembly 62 with its the coupler member 66 pulled upward against the bias of the retractable tube 67. Preferably, the retractable tube 67 is biased with a force of approximately 28 pounds. Thus, a pulling force greater than 28 pounds is required in order to place the coupler member 66 in the position shown in FIG. 9. The position of the coupler member 66 as shown in FIG. 9 is achieved by interaction with the coupling mechanism 86 in a manner shown in FIG. 15 and described later in this disclosure.

FIG. 10 illustrates an exploded view of the base portion 80 of the shorthand machine 20a shown in FIG. 7. As seen in FIG. 10, the base portion 80 includes a key groove 82 for engaging the key means 64 and guiding the coupler member 66 to the slot 90. The base portion 80 further includes a coupling mechanism 86 for securing the base portion 80 of the shorthand machine 20b to the coupler assembly 62 and coupler member 66 of the tripod 60. The coupling mechanism 86 generally includes a base plate 88 having a slot 90 for engaging the coupler member 66 of the coupler assembly 62. A pivoting lever 92 is biased as shown, and an outer end 94 of the lever 92 extends through a side slot 98 in the base plate 88. The interior face of the base plate 88 includes a pair of ramps for engaging the arms 72, 74 of the coupler member 66. The ramps 100, 102 are illustrated generally by the sectional views shown in FIGS. 14 and 15.

FIGS. 11, 12 and 13 illustrate the interaction between the coupler member 66, the lever 92, and the lever bias as the coupler member 66 is inserted through the slot 90 in the base plate 88 and rotated clockwise. The thickness of the base plate is sufficient to fit within the 0.06 inch clearance between the coupler member 66 and the key means 64. This allows the shorthand machine 20b to be rotated relative to the tripod 60 when the coupler member 66 is inserted through the slot 90.

As shown in FIG. 11, when the coupler member 66 is initially inserted through the slot 90, the coupler member 66 is positioned such that one arm 72 of the coupler member 66 is adjacent the inner end 94 of the lever 92. As the tripod 60 is rotated clockwise with respect to the shorthand machine 20b, one arm 72 of the coupler member 66 pushes against the inner end 94 and the lever bias.

FIG. 12 illustrates the relative positions of the coupler member 66 and the lever 92 after the coupler member 66 has been rotated approximately 45 degrees. As shown in FIG. 12, the coupler member 66 overcomes the lever bias, thereby turning the pivoting lever 92 counter-clockwise.

As the coupler member 66 continues to rotate clockwise, it eventually passes inner end 94 of the lever 92. The lever bias then turns the lever 92 back to its biased position, and the relative positions of the coupler member 66 and the lever 92 are as shown in FIG. 13. In this position, the inner end 94 of the lever 92 prevents the coupler member 66 from rotating in the counter-clockwise direction.

As the coupler member 66 is rotated in the manner shown in FIGS. 11, 12 and 13, the arms 72, 74 of the coupler member 66 are lifted by the ramps 100, 102 on the inner surface of the base plate 88, thereby pulling the key means 64 against the base plate 88 and securing the coupler assembly 62 to the coupler mechanism 86. One ramp 100 is illustrated in FIG. 14, which is a partial sectional view of the base plate 88 taken along line 14—14. The ramp 100 includes an inclined surface 104 and a stop 106. As the coupler member 66 is rotated clockwise, the inclined surface 104 of one ramp 100 lifts one arm 72 of the coupler member 66. At the same time, the inclined surface 108 of the other ramp 102 (shown in FIG. 15) lifts the other arm 74 of the coupler member 66. Stops 106, 110 are provided at the tops of the ramps 100, 102 to prevent the arms 72, 74 of the coupler member 66 from continuing in the clockwise direction.

FIG. 15 illustrates a partial sectional view of the base plate 88 of the shorthand machine 20b shown in FIG. 10 taken along line 15—15. The view in FIG. 15 has been modified to show the position of the coupler assembly 62 after the coupler member 66 has been inserted into the slot 90 and rotated to the position shown in FIG. 13. As shown in FIG. 15, the ramps 100, 102 have lifted the coupler member 66 against the bias of the retractable tube 67, thus securing the base plate 88 between the coupler member 66 and the key means 64. The stops 106, 110 prevent the coupler member 66 from being rotated further in the clockwise direction, and the inner end 94 of the lever 92 prevents the coupler member 66 from being rotated further in the counter-clockwise direction.

In order to release the coupler assembly 62 of the tripod 60 from the coupling mechanism 86 of the shorthand machine 20b, the outer end 96 of the lever 92 is rotated against the lever bias so that the inner end 94 of the lever 92 no longer blocks the counter-clockwise rotation of the coupler member 66. The tripod 60 is then rotated counter-clockwise until the coupler member 66 is again aligned with the slot 90. The shorthand machine 20b may now be lifted from the tripod 60.

Thus, it can be seen from the above-described embodiment of the invention, taken in conjunction with the accompanying drawings, that the present invention provides several advantages. For example, as shown in FIGS. 16 and 17, the present invention allows stenographers to use an efficient maneuver for mating the tripod 60 with the base portion 80 of the shorthand machine 20b. First, the tripod 60 is unfolded and placed in a desired spot on the floor. The shorthand machine 20b is then lowered over the tripod until the key means 64 enters the key groove 82. The key means 64 is large enough to be easily engaged with the key groove 82 without the need to watch the key means 64 as it is inserted into the key groove 82. The general orientation of the coupler member 66 with respect to the key means 64 is the same as the general orientation between the slot 90 and the key groove 82. Additionally, there is only one proper orientation for inserting the key means 64 into the key groove 82. Thus, when the key means 64 is properly inserted in the key groove 82, the coupler member 66 is automatically aligned with the slot 90.

The outer geometry and relative size of the key means 64 may be chosen such that its proper orientation with respect to the key groove 82 is easily achieved without the need to actually see the key means 64 as it is inserted into the key groove 82. Thus, the shorthand machine 20b is easily mated with the coupler assembly 62 of the tripod 60 by first unfolding the tripod 60 and placing it in a desired position on the floor, grasping the shorthand machine 20b with both hands, and then lowering the shorthand machine 20b over the tripod 60 until the key means 64 engages the key groove 82. When the key means 64 is properly oriented with respect to the key groove 82, the coupler member 66 is automatically aligned with the slot 90 in the base plate 88 of the shorthand machine 20b.

While the above-described embodiments of the invention are preferred, those skilled in this art will recognize modifications of structure, arrangement, composition and the like which do not part from the true scope of the invention. The invention is defined by the appended claims, and all devices and/or methods that come within the meaning of the claims, either literally or by equivalents, are intended to be embraced therein.

I claim:

1. A tripod for supporting a shorthand machine, the tripod comprising:
   support legs connected to a stem;
   a coupler assembly connected to said stem;
   said coupler assembly comprising a coupler member having an engagement position and a non-engagement position, said engagement position allowing said coupler member to secure the tripod to the shorthand machine;
   said coupler assembly further comprising a key of different size than said coupler member; and
   said key allowing said coupler member to move into its engagement position only when said key is engaged completely within a key groove.

2. The tripod defined in claim 1 wherein said key groove comprises substantially the same outer geometry as said key.

3. The tripod defined in claim 2 wherein said key can engage said key groove in only one or more predetermined orientations.

4. The tripod defined in claim 2 wherein said outer geometry of said key comprises:
   at least one substantially planar edge; and
   at least one substantially curved edge.

5. The tripod defined in claim 2 wherein said key comprises a substantially flat plate having:
   at least one substantially planar edge; and
   at least one substantially curved edge.

6. The tripod defined in claim 1 wherein said coupler member comprises a tab, and said engagement position comprises said tab engaging a slot in said shorthand machine.

7. The tripod defined in claim 1 wherein said engagement position of said coupler member comprises engagement between said coupler member and a coupling mechanism located in the base of the shorthand machine.

8. The tripod defined in claim 1 wherein said key groove comprises a fixed length periphery.

9. A tripod for supporting a shorthand machine, the tripod comprising:
   support legs connected to a stem;
   a coupler assembly connected to said stem;
   said coupler assembly comprising a coupler member for engaging an opening to thereby secure the tripod to the shorthand machine;
   said opening having a fixed length periphery;
   said coupler assembly further comprising a key of different size than said coupler member; and
   said key ensuring that said coupler member is properly aligned for engagement with said opening.

10. A coupler assembly for connecting a tripod to a shorthand machine, the coupler assembly comprising:
    a coupler member capable of securing the tripod to the shorthand machine;
    a key member of different size than said coupler member, said key member capable of engaging a key groove;
    said key member capable of engaging said key groove in only one or more predetermined orientations completely within said key groove, and when said key member and key groove are in said predetermined orientations said coupler member is aligned for securing the tripod to the shorthand machine.

11. The invention of claim 10 wherein said outer geometry of said key member comprises:

at least one substantially planar edge; and
at least one substantially curved edge.

12. The invention of claim 10 wherein said key groove comprises a fixed length periphery.

* * * * *